(12) United States Patent
Kodama et al.

(10) Patent No.: US 11,920,529 B2
(45) Date of Patent: Mar. 5, 2024

(54) CONTROL METHOD AND CONTROL APPARATUS FOR INTERNAL COMBUSTION ENGINE

(71) Applicant: NISSAN MOTOR CO., LTD., Yokohama (JP)

(72) Inventors: Takayoshi Kodama, Kanagawa (JP); Yoshihiko Iwabuchi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/632,960

(22) PCT Filed: Apr. 15, 2021

(86) PCT No.: PCT/JP2021/015531
§ 371 (c)(1),
(2) Date: Oct. 20, 2022

(87) PCT Pub. No.: WO2022/219765
PCT Pub. Date: Oct. 20, 2022

(65) Prior Publication Data
US 2024/0018917 A1 Jan. 18, 2024

(51) Int. Cl.
*F02D 41/00* (2006.01)

(52) U.S. Cl.
CPC ..... *F02D 41/0055* (2013.01); *F02D 41/0052* (2013.01); *F02D 2200/501* (2013.01); *F02D 2200/703* (2013.01)

(58) Field of Classification Search
CPC ............. F02D 41/0055; F02D 41/0052; F02D 41/005; F02D 41/0007; F02D 41/0072; F02D 2200/501; F02D 2200/703; F02D 2200/1015; F02D 35/027; F02D 2041/001; F02M 26/05; F02M 26/06; F02M 26/01;
(Continued)

(56) References Cited

U.S. PATENT DOCUMENTS

| 9,784,197 B2 * | 10/2017 | Makino | F02D 41/0072 |
| 9,879,621 B2 * | 1/2018 | Glugla | F02D 29/02 |
| 10,801,436 B2 * | 10/2020 | Kassai | F02D 41/3029 |

(Continued)

FOREIGN PATENT DOCUMENTS

JP 2014-214639 A 11/2014

*Primary Examiner* — Shafiq Mian
*Assistant Examiner* — Dapinder Singh
(74) *Attorney, Agent, or Firm* — Foley & Lardner LLP (57) ABSTRACT

A first output limit value is determined as an intersection point of a knock-limit output line which is set according to an exhaust gas recirculation rate and ignition timing and an exhaust-temperature-limit output line which is set according to the exhaust gas recirculation rate and ignition timing; a second output limit value is determined as an intersection point of the knock-limit output line and an air-quantity-limit output line which is set according to the exhaust gas recirculation rate, ignition timing and atmospheric pressure; and a third output limit value is determined as an intersection point of the knock-limit output line and a thermal-management-limit output line which is set according to the exhaust gas recirculation rate, ignition timing and vehicle running speed. A value of the exhaust gas recirculation rate at which the condition "P1≥P2 or P1≥P3" is satisfied is set as a target exhaust gas recirculation rate.

10 Claims, 8 Drawing Sheets

(58) Field of Classification Search
CPC ............. F02M 35/10222; F02P 5/1516; F02P 2017/128; Y02T 10/12; Y02T 10/40
See application file for complete search history.

(56) References Cited

U.S. PATENT DOCUMENTS

2004/0237510 A1* 12/2004 Kusada ................. B60W 10/06
                                                       903/917
2017/0159587 A1*  6/2017 Glugla ................. F02D 35/027

* cited by examiner

CONTROL METHOD AND CONTROL APPARATUS FOR INTERNAL COMBUSTION ENGINE

TECHNICAL FIELD

The present invention relates to control of an internal combustion engine mounted on a vehicle and, more particularly, to control of an exhaust gas recirculation rate in an internal combustion engine with an exhaust gas recirculation device.

BACKGROUND ART

An exhaust gas recirculation technology has been developed mainly for the purpose of reducing NOx emissions from internal combustion engines in middle-load regions. In recent years, exhaust gas recirculation is being utilized mainly for knock suppression and exhaust temperature reduction in order to enable operations of internal combustion engines at the theoretical air fuel ratio in high-speed high-load regions.

In such exhaust gas recirculation in the high-speed high-load region, it is necessary to control the exhaust gas recirculation rate within various limits such that the internal combustion engine can ensure a sufficient output.

Patent Document 1 relates to a diesel engine and discloses that, at a high altitude where the air is thin, exhaust gas recirculation is stopped so as to suppress smoke generation. However, Patent Document 1 does not teach suppressing as much as possible decrease of engine output with decrease of atmospheric density at a high altitude.

PRIOR ART DOCUMENTS

Patent Document

Patent Document 1: Japanese Laid-Open Patent Publication No. 2014-214639

SUMMARY OF THE INVENTION

The present invention is directed to control of an internal combustion engine with an exhaust gas recirculation device, the internal combustion engine having: a first output limit which is associated with at least a knock limit and whose value increases with increase of an exhaust gas recirculation rate; and a second output limit which is associated with an output limiting factor including an atmospheric pressure or vehicle running speed and whose value decreases with decrease of the output limiting factor and with increase of the exhaust gas recirculation rate, wherein the exhaust gas recirculation device is controlled according to a target exhaust gas recirculation rate at which the first output limit becomes equal to the second output limit.

The first output limit, which is associated with the knock limit etc., has a higher value as the exhaust gas recirculation rate increases. The target engine output can be thus set to a higher value. In the case where e.g. the atmospheric pressure is adopted as the output limiting factor, however, the possible output value of the internal combustion engine decreases as the atmospheric pressure decreases with increasing altitude. Besides, the second output limit has a lower value as the exhaust gas recirculation rate increases. Hence, the possible output value conversely decreases under the constraint of the second output limit when the exhaust gas recirculation rate increases excessively at a high altitude.

The vehicle running speed is also adoptable as the output limiting factor in terms of thermal management of the internal combustion engine, that is, balance between the amount of heat radiation from the cooling system, which is correlated with the vehicle running speed, and the amount of heat absorption into the cooling system, which is correlated with the exhaust gas recirculation rate and the output. In the case where a high output is required during running of the vehicle at a low running speed as in towing operation etc., the second output limit decreases with decrease of the vehicle running speed and with increase of the exhaust gas recirculation rate. Hence, the possible output value decreases under the constraint of the second output limit when the exhaust gas recirculation rate increases excessively Accordingly, the exhaust gas recirculation rate at which the first and second output limits, each set according to the exhaust gas recirculation rate as a parameter, become equal to each other is the most appropriate exhaust gas recirculation rate to obtain the highest possible output in consideration of the output limiting factor such as atmospheric pressure or vehicle running speed.

BRIEF DESCRIPTION OF DRAWINGS

FIGS. 3(a) and (b) are diagrams respectively showing output characteristics of the internal combustion engine during running of the vehicle at a sufficient vehicle running speed at an altitude of 0 m without and with the execution of exhaust gas recirculation.

FIGS. 4(a) and (b) are diagrams respectively showing output characteristics of the internal combustion engine during running of the vehicle at a sufficient vehicle running speed at a high altitude without and with the execution of exhaust gas recirculation.

FIGS. 5(a) and (b) are diagrams respectively showing output characteristics of the internal combustion engine during running of the vehicle at a low vehicle running speed at an altitude of 0 m without and with the execution of exhaust gas recirculation.

DESCRIPTION OF EMBODIMENTS

Hereinafter, one exemplary embodiment of the present invention will be described in detail below with reference to the drawings.

Figure 1:
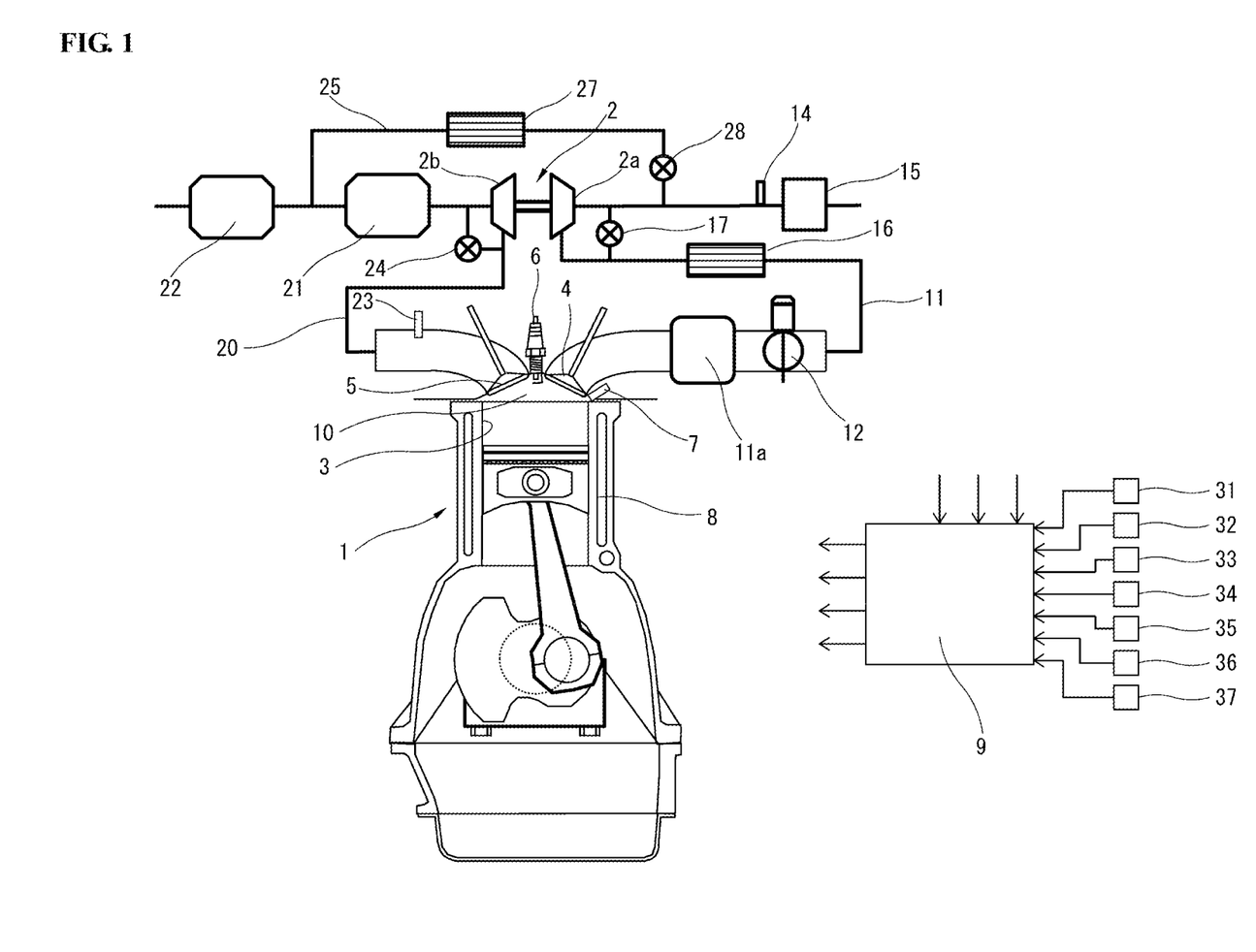
FIG. 1 is a schematic system configuration view of an internal combustion engine for a vehicle to which the present invention is applicable.

FIG. 1 schematically shows the system configuration of a vehicle internal combustion engine 1 to which the present invention is applicable. The internal combustion engine 1 is, for example, a four-stroke-cycle spark ignition type internal combustion engine equipped with a turbocharger 2. In the engine, a pair of intake valves 4 and a pair of exhaust valves 5 are disposed on a ceiling wall surface of each cylinder 3.

A spark plug 6 is disposed on a center portion of the ceiling wall surface surrounded by these intake and exhaust valves 4 and 5. A fuel injection valve 7 is disposed at a position below the intake valves 4 so as to supply fuel into the cylinder 3. The timing of ignition by the spark plug 6 and the timing and amount of injection of fuel by the fuel injection valve 7 are controlled by an engine controller 9. The cylinder 3 is surrounded by a water jacket 8 through which coolant water flows.

An intake passage 11 is connected to a combustion chamber 10 via the intake valves 4. An intake collector 11a is mounted to the intake passage. An electronically-controllable throttle valve 11, whose opening is controlled by a control signal from the engine controller 10, is mounted to the intake passage at a position upstream of the intake collector 11a. A compressor 2a of the turbocharger 2 is mounted to the intake passage at a position upstream of the throttle valve 12. An air flow meter 13 for detecting an intake air quantity and an air cleaner 14 are disposed in the intake passage at positions upstream of the compressor 2a. A water-cooled intercooler 16 is disposed between the compressor 2a and the throttle valve 11 so as to cool highly heated and pressurized intake air. A recirculation valve 17 is disposed to provide communication between discharge and intake sides of the compressor 2a. This recirculation valve 17 is opened during deceleration in which the throttle valve 12 is closed.

An exhaust passage 20 is connected to the combustion chamber 10 via the exhaust valves 5. A turbine 2b of the turbocharger 2 is mounted to the exhaust passage 20. A pre-catalyst unit 21 and a main catalyst unit 22, each of which is provided as a three-way catalyst, is mounted to the exhaust passage at positions downstream of the turbine. An air fuel ratio sensor 23 is disposed in the exhaust passage 20, at a position upstream of the turbine 2b, to detect an air fuel ratio. The turbine 2b is provided with a wastegate valve 24 so as to control a boost pressure by allowing bypassing of a part of exhaust gas according to the boost pressure. The wastegate valve 24 is configured as e.g. an electronically-operable valve whose opening is controlled by the engine controller 9.

As an exhaust gas recirculation device, an exhaust recirculation passage 25 is provided to recirculate a part of exhaust gas from the exhaust passage 20 into the intake passage 11. For example, one end of the exhaust recirculation passage 25 is connected a portion of the exhaust passage 20 between the pre-catalyst unit 21 and the main catalyst unit 22; whereas the other end of the exhaust recirculation passage 25 is connected to a portion of the intake passage 11 upstream of the compressor 2a. The exhaust recirculation passage 25 has mounted thereon a water-cooled EGR gas cooler 27 for cooling the recirculated exhaust gas and an EGR valve 28 for controlling the rate of recirculation of the exhaust gas. The opening of the EGR valve 28 is controlled by the engine controller 9.

There are provided various sensors including not only the air flow meter 14 and the air fuel ratio sensor 23, but also a crank angle sensor 31 for detecting a rotation speed of the engine, a coolant water temperature sensor 32 for detecting a temperature of the coolant water, an accelerator opening sensor 33 for detecting an amount of depression of an accelerator pedal operated by a driver, a vehicle running speed sensor 34 for directly or indirectly detecting a running speed of the vehicle, an atmospheric pressure sensor 35 for detecting an atmospheric pressure, an outside air temperature sensor 36 for detecting an outside air temperature and a boost pressure sensor 37 for detecting a boost pressure.

Detection signals from these various sensors are inputted into the engine controller 9. The engine controller 9 is configured to optimally control the fuel injection amount and timing, the ignition timing, the opening of the throttle valve 12, the opening of the EGR valve 28, the boost pressure etc. based on the inputted detection signals.

The internal combustion engine 1 is further equipped with a known water-cooled cooling device so as to allow circulation of the coolant water between the water jacket 8 and a radiator (not shown). Heat of the intercooler 16 and heat of the EGR gas cooler 27 are also radiated by the radiator through the coolant water. The radiator is arranged on a front portion of the vehicle body so as to receive vehicle running wind.

Next, the control of the exhaust gas recirculation rate as substantial part of the present invention and, more specifically, the control of the exhaust gas recirculation rate for ensuring higher engine output in a high-speed high-load region will be explained below. The term "EGR" is hereinafter used as appropriate to refer to exhaust gas recirculation or exhaust gas recirculation rate.

Figure 2:
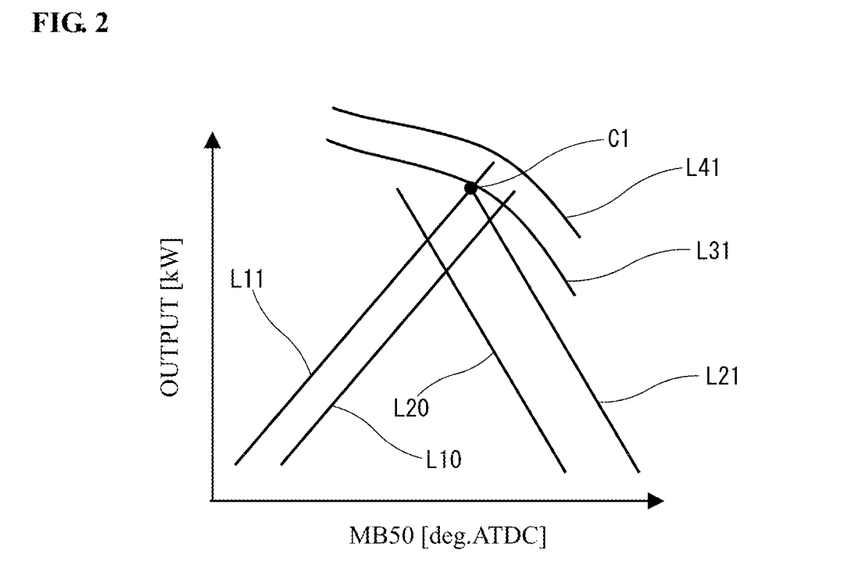
FIG. 2 is a characteristic diagram showing some limits on the output of the internal combustion engine in a high-load region.

An explanation will first be given of some limits on the output of the internal combustion engine 1 with reference to a characteristic diagram of FIG. 2. In FIG. 2, the vertical axis represents the output (kW) of the internal combustion engine 1; and the horizontal axis represents the center of gravity of combustion, that is, MB50 (° ATDC). The term "MB50" is in correlation with the ignition timing, and is herein assumed as a parameter that can be arbitrarily controlled by changing the ignition timing.

FIG. 2 shows an example of the output characteristics of the internal combustion engine 1 during running of the vehicle at a sufficient vehicle running speed at an altitude of 0 m with the execution of exhaust gas recirculation at an appropriate exhaust gas recirculation rate (e.g. a basic exhaust gas recirculation rate set corresponding to the load and rotation speed of the internal combustion engine 1). The output of the spark ignition type internal combustion engine 1 in the high-speed high-load region is first limited by a knock limit as indicated by line L11. In the upper left area of FIG. 2 than the knock limit L11, the operation cannot be held due to the occurrence of knock. The operation can be held only in the lower right area of FIG. 2 than the knock limit L11. The earlier the ignition timing, the more likely the occurrence of knock, the more limited the output. The knock limit L11 is thus a characteristic line inclined as shown in the figure. Herein, line L10 represents a characteristic of the knock limit in the case where EGR is 0, that is, exhaust gas recirculation is not carried out. Since the occurrence of knock is suppressed by the execution of EGR, the knock limit characteristic line L11 shifts to the upper or upper left side as the exhaust gas recirculation rate increases.

Similarly, the output of the internal combustion engine 1 in the high-speed high-load region is limited by an exhaust temperature limit as indicated by line L21 from the viewpoint of protection of exhaust system components etc. because the exhaust temperature rises in the high-speed high-load region. The more the MB50 shifts to the retarded side, the higher the exhaust temperature. Thus, the exhaust temperature limit L21 is a characteristic line inclined downward to the right as shown in FIG. 2. The operation can be held only in the lower left area of FIG. 2 than the exhaust temperature limit L21. Herein, line 120 represents a characteristic of the exhaust temperature limit in the case where EGR is 0, that is, exhaust gas recirculation is not carried out. Since the exhaust temperature decreases with the execution of EGR, the exhaust temperature limit line L21 shifts to the upper or upper right side as the exhaust gas recirculation rate increases.

Accordingly, the operation is established only in the area surrounded by the characteristic lines L11 and L21 in terms of the knock limit and the exhaust temperature limit. The maximum possible output of the internal combustion engine 1 is therefore basically determined by an intersection point C1 of the characteristic lines L11 and L21. In other words, the internal combustion engine attains an output corresponding to the intersection point C1 by setting the MB50 corresponding to the intersection point C1 in FIG. 2.

As the exhaust gas recirculation rate increases, each of the characteristic lines L11 and L21 shifts upward so that the maximum possible output corresponding to the intersection point C1 becomes high. This leads to a higher engine output by suppression of knock and decrease of exhaust temperature as the exhaust gas recirculation rate increases.

Further, the output of the internal combustion engine 1 is limited by an air quantity limit depending on the turbocharger 2. The air quantity limit is a characteristic line curved downward to the right as indicated by line L31 in FIG. 2. The quantity of air forced into the cylinder 3 by the turbocharger 2 is set constant in accordance with the atmospheric pressure. The higher the exhaust gas recirculation rate, the smaller the quantity of air fed (that is, the quantity of oxygen). Thus, the value of the air quantity limit L31 decreases with increase of the exhaust gas recirculation rate. In FIG. 2, the air quantity limit L31 shifts downward as the exhaust gas recirculation rate increases. The value of the air quantity limit L31 also decreases with decrease of the atmospheric pressure. In FIG. 2, the air quantity limit L31 shifts downward as the atmospheric pressure decreases. For simplification purposes, the atmospheric pressure is hereinafter simply referred to as "atmospheric pressure", regardless of being corrected by the temperature or not, although strictly speaking it is preferable that the atmospheric pressure is corrected by the outside air temperature.

Furthermore, the output of the internal combustion engine 1 in the high-speed high-load region is limited in terms of thermal management, that is, balance between the amount of heat generated on the internal combustion engine 1 side and to be radiated from the radiator and the amount of heat actually radiated from the radiator (including heat radiation from surfaces of high temperature parts). More specifically, there develops an overheated condition if heat generated by the internal combustion engine 1 cannot be properly radiated from the radiator. From this point of view, the output of the internal combustion engine is limited by a thermal management limit. The thermal management limit is a characteristic line curved downward to the right as indicated by line L41 in FIG. 2. The higher the exhaust gas recirculation rate, the larger the amount of heat exchange by the intercooler 16 and the EGR gas cooler 27. The heat generation (equivalently, output) of the internal combustion engine 1 itself (such as cylinder 3) is correspondingly limited in order to keep the total heat generation amount constant. Thus, the value of the thermal management limit L41 decreases with increase of the exhaust gas recirculation rate. In FIG. 2, the thermal management limit L41 shifts to the lower output side as the exhaust gas recirculation rate increases. The thermal management limit L41 is further largely influenced by the vehicle running speed. The higher the vehicle running speed, the smaller the amount of heat radiated from the radiator etc. under the influence of vehicle running wind. Consequently, the thermal management limit L41 decreases with increase of the vehicle running speed.

As mentioned above, FIG. 2 corresponds to the condition where the vehicle is running at a sufficient running speed at an altitude of 0 m with the execution of EGR at an appropriate exhaust gas recirculation rate. In such a case, the characteristic lines of the air quantity limit L3 and the thermal management limit IA are located above the intersection point C1. This means that the maximum possible output corresponding to the intersection point C1 would not be limited by the air quantity limit L3 and the thermal management limit L4. It is thus possible to obtain an output determined by the knock limit L11 and the exhaust temperature limit L21. The maximum possible output value increases as the exhaust gas recirculation rate increases.

Figure 3:
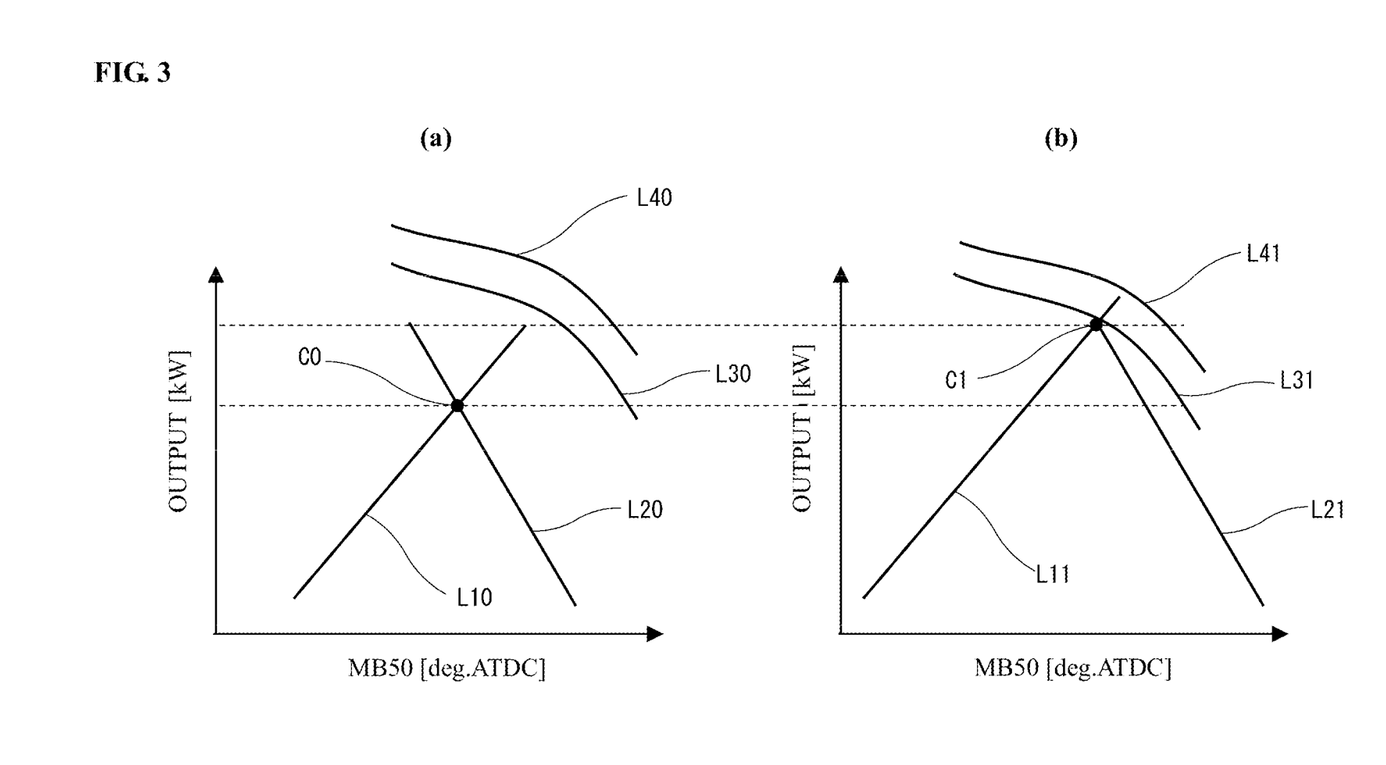
Figure 4:
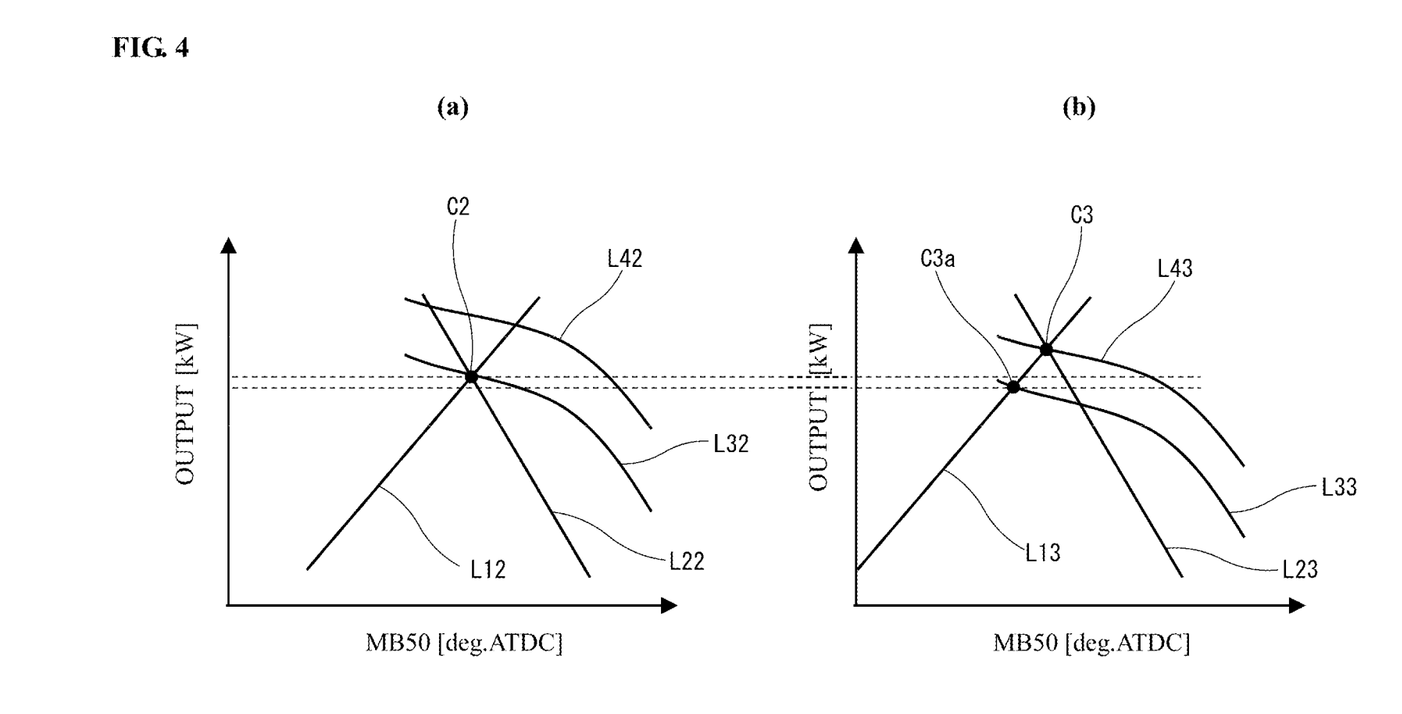
Figure 5:
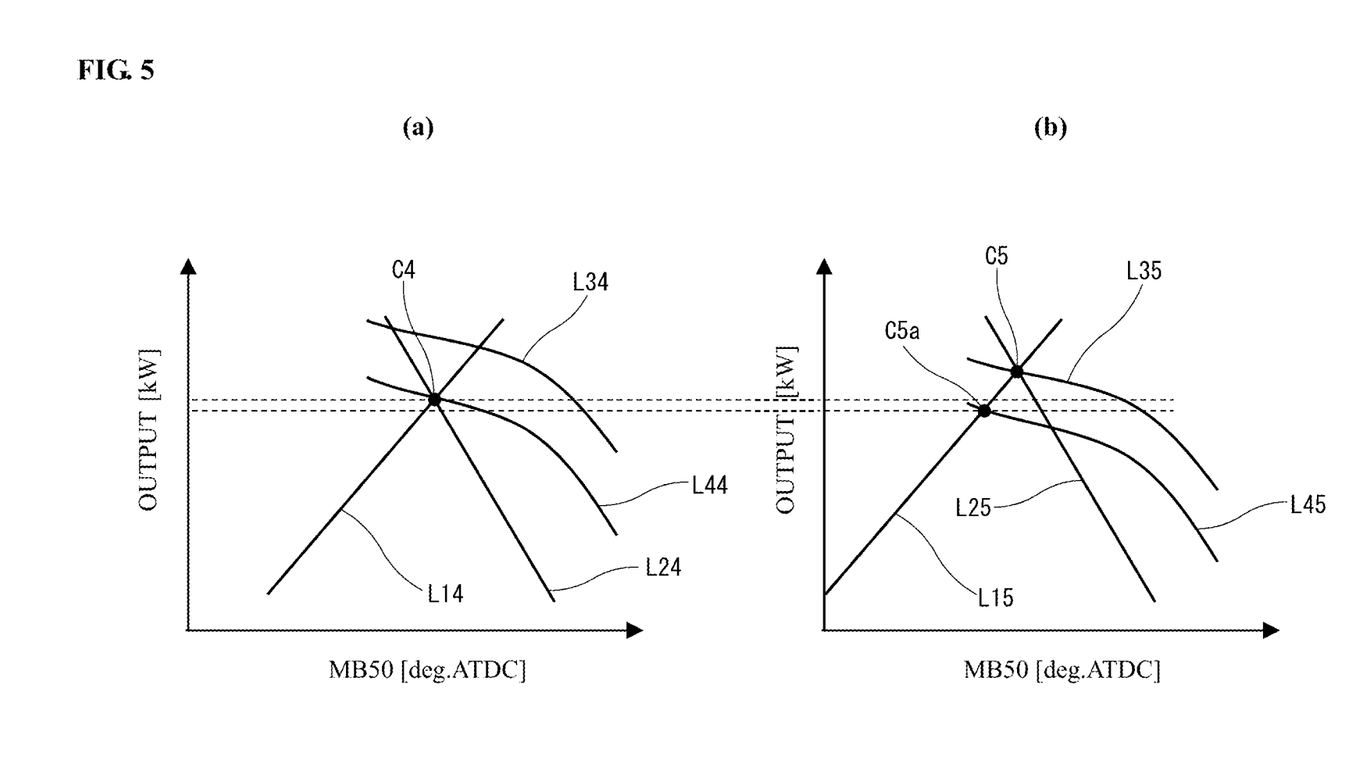

FIGS. 3, 4 and 5 show changes of the respective limits with and without the execution of exhaust gas recirculation, along with the influences of the atmospheric pressure and vehicle running speed on the respective limits. More specifically, FIGS. 3(a) and (b) respectively show examples of the engine output characteristic during running of the vehicle at a sufficient vehicle running speed at an altitude of 0 m without and with the execution of exhaust gas recirculation. The characteristic diagram of FIG. 2 is substantially the same as the characteristic diagram of FIG. 3(b).

In FIG. 3, the output is limited to a value corresponding to the intersection point C0 by the knock limit L10 and the exhaust temperature limit L20 when exhaust gas recirculation is not carried out (see FIG. 3(a)); and the output can be increased to a value corresponding to the intersection point C1 when exhaust gas recirculation is carried out (see FIG. 3(b)). In either of these cases, the output is not limited by the air quantity limit L30, L31 and the thermal management limit L40, L41.

FIGS. 4(a) and (b) respectively show examples of the engine output characteristic during running of the vehicle at a sufficient vehicle running speed at a high altitude (equivalently, low atmospheric pressure) without and with the execution of exhaust gas recirculation. When exhaust gas recirculation is not carried out, the intersection point C2 of the knock limit L12 and the exhaust temperature limit L22 is set as shown in FIG. 4(a). When exhaust gas recirculation is carried out, the intersection point C3 of the knock limit L13 and the exhaust temperature limit L23 is set as shown in FIG. 4(b). The output value corresponding to the intersection point C3 is higher than the output value corresponding to the intersection point C2. Under a low atmospheric pressure condition, however, the quantity of air (oxygen) decreases while the amount of gas forced into the cylinder 3 by the turbocharger 2 remains constant. As a result, the air quantity limit decreases as indicated by its characteristic line L32, L33. The air quantity limit decreases with decrease of the atmospheric pressure. Further, the air quantity limit decreases with increase of the exhaust gas recirculation rate as seen from comparison of these two lines L32, L33.

When the atmospheric pressure is high and the exhaust gas recirculation rate is high to a certain extent as in FIG. 4(b), the air quantity limit L33 may be located below the intersection point C3. In this case, the output is also limited by the air quantity limit L33. In other words, the output is limited to a value corresponding to the intersection point C3a, which is lower than that corresponding to the intersection point C3. In the example of FIG. 4, the intersection point C3a in FIG. 4(b) is lower than the intersection point C2 in FIG. 4(a). It means that the maximum possible output value conversely decreases with the execution of exhaust gas recirculation.

FIGS. 5(a) and (b) respectively show examples of the engine output characteristic during running of the vehicle at a low vehicle running speed at an altitude of 0 m without and with the execution of exhaust gas recirculation. This corresponds to the condition where the vehicle is running at a low running speed by high speed high load operation, such as where the vehicle is towing another vehicle. When exhaust gas recirculation is not carried out, the intersection point C4 of the knock limit L14 and the exhaust temperature limit L24 is set as shown in FIG. 5(a). When exhaust gas recirculation is carried out, the intersection point C5 of the knock limit L15 and the exhaust temperature limit L25 is set as shown in FIG. 5(b). The output value corresponding to the intersection point C5 is higher than the output value corresponding to the intersection point C4. During low-speed running such as towing of the vehicle, however, the thermal management limit decreases as indicated by its characteristic line L44, L45. The thermal management limit L44, L45 decreases with decrease of the vehicle running speed. Further, the thermal management limit decreases with increase of the exhaust gas recirculation rate as seen from comparison of these two lines L44 and L45.

When the vehicle running speed is low and the exhaust gas recirculation rate is high to a certain extent as in FIG. 5(b), the thermal management limit L45 may be located below the intersection point C5. In this case, the output is also limited by the thermal management limit L45. In other words, the output is limited to a value corresponding to the intersection point C5a, which is lower than that corresponding to the intersection point C5. In the example of FIG. 5, the intersection point C5a in FIG. 5(b) is lower than the intersection point C4 in FIG. 5(a). It means that the maximum possible output value conversely decreases with the execution of exhaust gas recirculation.

As mentioned above, exhaust gas recirculation is an effective means to ensure a high output while avoiding limitations of knock, exhaust temperature etc. in the high-speed high-load region. Conversely, the output is limited with the execution of excessive exhaust gas recirculation in the cases where the altitude is high and the atmospheric pressure is low, where the vehicle is running at a low running speed such as towing etc. Under these conditions, the exhaust gas recirculation needs to be controlled appropriately so as to ensure a high output.

Figure 6:
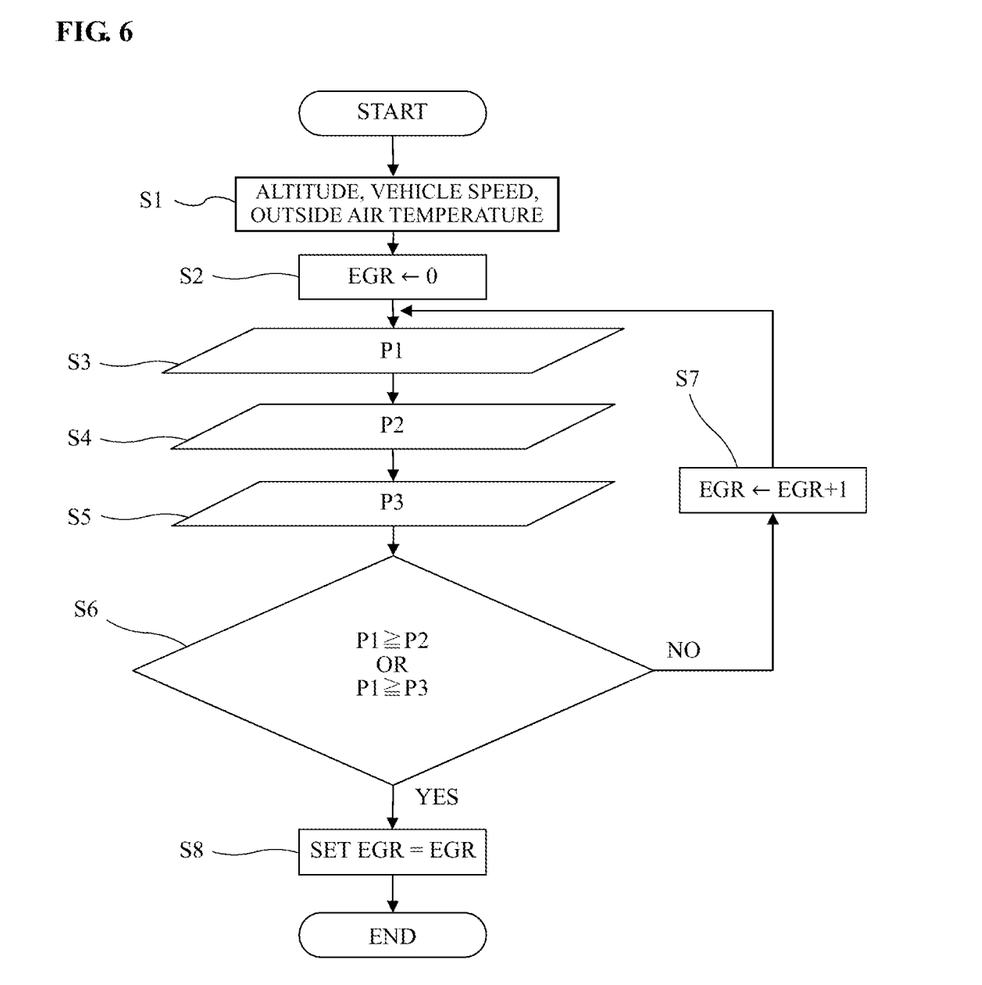
FIG. 6 is a flowchart for a process of setting an appropriate target exhaust gas recirculation rate in a high-speed high-load region.

FIG. 6 shows a flowchart of processing executed by the engine controller 9 for setting an appropriate target exhaust gas recirculation rate in the high-speed high-load region. According to this flowchart, the first, second and third output limit values P1, P2 and P3 are obtained, and then, the optimal target exhaust gas recirculation rate is set based on magnitude comparison of these output limit values. Herein, the first output limit value P1 corresponds to the claimed first output limit; the second output limit value P2 corresponds to the claimed one type of second output limit; and the third output limit value P3 corresponds to the claimed another type of second output limit.

In step 1, required parameters including altitude (atmospheric pressure), vehicle running speed and outside air temperature are read. In step 2, the target exhaust gas recirculation rate (EGR) is initialized to 0.

Figure 7:
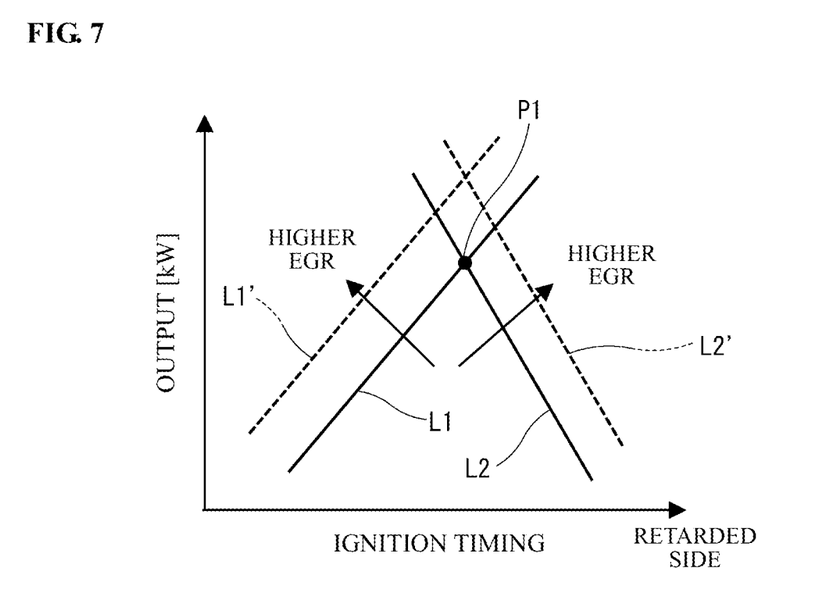
FIG. 7 is a schematic diagram showing a map for obtaining a first output limit value P1.

In step 3, the first output limit value P1 is determined from the knock limit and the exhaust temperature limit each of which is set according to the exhaust gas recirculation rate (whose initial value is 0). More specifically, the first output limit value P1 is determined using a characteristic map of FIG. 7 as an intersection point of the knock-limit output line L1 which is set according to the exhaust gas recirculation rate and the ignition timing and the exhaust temperature-limit output line L2 which is set according to the exhaust gas recirculation rate and the ignition timing. Herein, the map of FIG. 7 shows the same relationship as those of FIGS. 2 to 5. The ignition timing represented by the horizontal axis corresponds to the above-mentioned MB50 (combustion gravity center). The knock-limit output line L1 and the exhaust-temperature-limit output line L2 shift as indicated by broken lines L1' and L2' as the exhaust gas recirculation rate increases. In other words, the knock-limit output line L1 and the exhaust-temperature-limit output line L2 are in the form of contour lines according to the exhaust gas recirculation rate. Consequently, the first output limit value P1 is determined in accordance with the exhaust gas recirculation rate.

Figure 8:
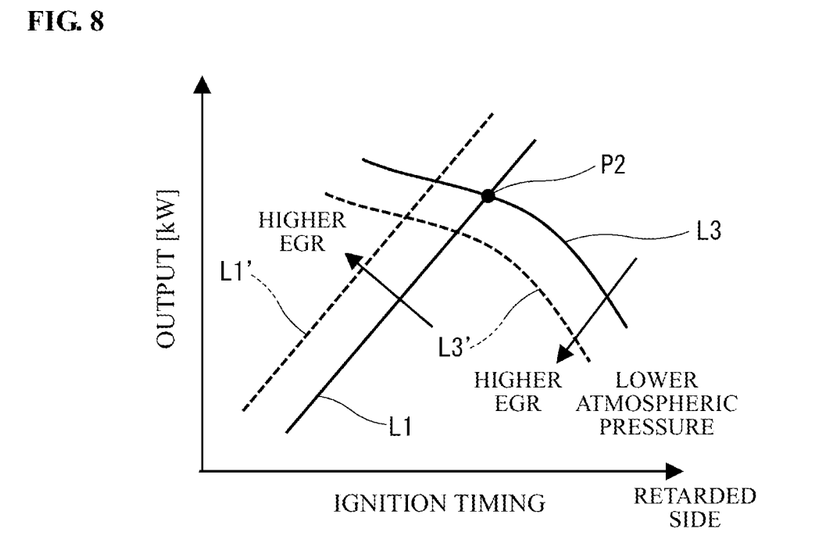
FIG. 8 is a schematic diagram showing a map for obtaining a second output limit value P2.

In step 4, the second output limit value P2 is determined from the knock limit and the air quantity limit each of which is set according to the exhaust gas recirculation rate (whose initial value is 0). More specifically, the second output limit value P2 is determined using a multidimensional characteristic map of FIG. 8 as an intersection point of the knock-limit output line L1 which is set according to the exhaust gas recirculation rate and the ignition timing and the air-quantity-limit output line L3 which is set according to the exhaust gas recirculation rate, the ignition timing and the atmospheric pressure. The knock-limit output line L1 shifts in the direction of increase of the output as indicated by broken line L1' as the exhaust gas recirculation rate increases. On the other hand, the air-quantity-limit output line L3 shifts in the direction of decrease of the output as indicated by broken line L3' as the exhaust gas recirculation rate increases and as the atmospheric pressure decreases. In other words, the air-quantity-limit output line L3 is in the form of a contour line according to the exhaust gas recirculation rate and the atmospheric pressure. Consequently, the second output limit value P2 is determined as the intersection point of the knock-limit output line L1 and the air-quantity-limit output line L3 in accordance with the exhaust gas recirculation rate and the atmospheric pressure.

Figure 9:
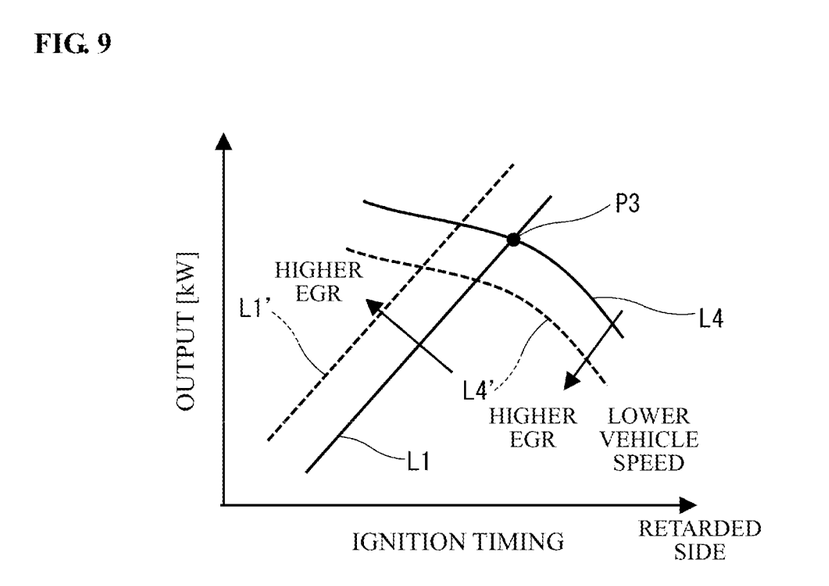
FIG. 9 is a schematic diagram showing a map for obtaining a third output limit value P3.

In step 5, the third output limit value P3 is determined from the knock limit and the thermal management limit each of which is set according to the exhaust gas recirculation rate (whose initial value is 0). More specifically, the third output limit value P3 is determined using a multidimensional characteristic map of FIG. 9 as an intersection point of the knock-limit output line L1 which is set according to the exhaust gas recirculation rate and the ignition timing and the thermal-management-limit output line L4 which is set according to the exhaust gas recirculation rate, the ignition timing and the vehicle running speed. The knock-limit output line L1 shifts in the direction of increase of the output as indicated by broken line L1' as the exhaust gas recirculation rate increases. On the other hand, the thermal-management-limit output line L4 shifts in the direction of decrease of the output as indicated by broken line L4' as the exhaust gas recirculation rate increases and as the vehicle running speed decreases. In other words, the thermal-management-limit output line L4 is in the form of a contour line according to the exhaust gas recirculation rate and the vehicle running speed. Consequently, the third output limit value P3 is determined as the intersection point of the knock-limit output line L1 and the thermal-management-limit output line in accordance with the exhaust gas recirculation rate and the vehicle running speed.

Subsequently, the satisfaction or dissatisfaction of two OR conditions "P1≥P2" and "P1≥P3" is judged in step 6. In other words, it is judged whether the condition "P1≥P2 or P1≥P3" is satisfied or not. If the judgment result is NO, the processing goes to step 7. In step 7, the target exhaust gas recirculation rate (EGR) is incremented. Then, the processing of steps 3 to 6 is repeated so that the target exhaust gas recirculation rate is gradually incremented until the judgment result of step 6 becomes YES.

When the judgment result of step 6 becomes YES, the processing goes to step 8. In step 8, the value of the target exhaust gas recirculation rate (EGR) at that point in time is set as the target exhaust gas recirculation rate. The exhaust gas recirculation device of the internal combustion engine 1 including the EGR valve 28 is controlled according to this target exhaust gas recirculation rate. The judgment result of step 6 becomes YES for the first time when the condition "P1=P2 or P1=P3" is satisfied. When the first output limit value P1 becomes equal to the lower one of the second and third output limit values P2 and P3 that respectively correspond to the atmospheric pressure and the vehicle running speed at that point in time, the processing proceeds from step 6 to step 8. In other words, the exhaust gas recirculation rate is determined so as to obtain the highest output value among those limited by some factors.

By another processing (not shown), the target output of the international combustion engine 1 is set according to the target exhaust gas recirculation rate set in step 8. Then, the fuel injection amount and ignition timing of the internal combustion engine 1, the opening of the wastegate valve 24 and the like are controlled according to this target output.

Although the first to third output limit values P1 to P3 are respectively determined using the maps in the above-mentioned embodiment, each of the first to third output limit values P1 to P3 can alternatively be determined by calculation.

In the above-mentioned embodiment, the exhaust gas recirculation rate is controlled so as to obtain the highest output value as described above in the case where the atmospheric pressure as the output limiting factor under exhaust gas recirculation in the high-speed high-load region is low at a high altitude or in the case where the vehicle running speed as the output limiting factor is low during high-load operation such as towing. This control enables effective output acquisition.

In the case where any factor other than the atmospheric pressure and the vehicle running speed should be considered as the output limiting factor, it is feasible to similarly deal with the control processing by determining the output limit value under the limitation of such a factor in the same manner as above.

Further, it is feasible to directly detect the atmospheric pressure information by means of a sensor or to use altitude information obtained by a car navigation system as the atmospheric pressure information.

In the above-mentioned embodiment, the exhaust gas recirculation device is configured as a so-called low pressure EGR system in which recirculated exhaust gas flows into the intake system at a location upstream of the compressor 2a of the turbocharger 2. The present invention is applicable even in the case where the exhaust gas recirculation device is configured as a so-called high pressure EGR system in which recirculated exhaust gas flows into the intake system at a location downstream of the compressor 2a.

The present invention is also applicable to a naturally aspirated engine with no supercharger. Even in the naturally aspirated engine, the air-quantity-limit output line shifts to the lower output side as the atmospheric pressure decreases.

The invention claimed is:

1. A control method of an internal combustion engine mounted on a vehicle and comprising an exhaust gas recirculation device,
the internal combustion engine having: a first output limit which is associated with at least a knock limit and whose value increases with increase of an exhaust gas recirculation rate; and a second output limit which is associated with an output limiting factor including an atmospheric pressure or vehicle running speed and whose value decreases with decrease of the output limiting factor and with increase of the exhaust gas recirculation rate,
the control method comprising setting a target exhaust gas recirculation rate at which the first output limit becomes equal to the second output limit and controlling the exhaust recirculation device according to the target exhaust gas recirculation rate.

2. The control method of the internal combustion engine according to claim 1, wherein the control method comprises setting a target output value at which the first output limit and the second output limit become equal to each other and controlling output of the internal combustion engine according to the target output value.

3. The control method of the internal combustion engine according to claim 1, wherein the first output limit is determined from the knock limit and an exhaust temperature limit such that the value of the first output limit corresponds to the exhaust gas recirculation rate.

4. The control method of the internal combustion engine according to claim 1, wherein the second output limit is defined as an air quantity limit depending on a turbocharger and correlated with an atmospheric pressure and the exhaust gas recirculation rate.

5. The control method of the internal combustion engine according to claim 1, wherein the second output limit is defined as an output limit in terms of thermal management based on at least change in amount of heat radiation from a cooling system caused due to the vehicle running speed and change in amount of heat radiation to the cooling system caused by exhaust gas recirculation.

6. The control method of the internal combustion engine according to claim 1, wherein the second output limit is determined as a lower value among an output limit associated with the atmospheric pressure and an output limit associated with the vehicle running speed.

7. The control method of the internal combustion engine according to claim 1,
wherein the first output limit is determined as an intersection point of a knock-limit output line which is set according to the exhaust gas recirculation rate and an ignition timing and an exhaust-temperature-limit output line which is set according to the exhaust gas recirculation rate and the ignition timing, and
wherein the second output limit is determined as an intersection point of the knock-limit output line and an air-quantity-limit output line which is set according to the exhaust gas recirculation rate, the ignition timing and the atmospheric pressure.

8. The control method of the internal combustion engine according to claim 1,
wherein the first output limit is determined as an intersection point of a knock-limit output line which is set according to the exhaust gas recirculation rate and an ignition timing and an exhaust-temperature-limit output line which is set according to the exhaust gas recirculation rate and the ignition timing, and
wherein the second output limit is determined as an intersection point of the knock-limit output line and a thermal-management-limit output line which is set according to the exhaust gas recirculation rate, the ignition timing and the vehicle running speed.

9. The control method of the internal combustion engine according to claim 1, wherein the first output limit is determined as an intersection point of a knock-limit output line which is set according to the exhaust gas recirculation rate and an ignition timing and an exhaust-temperature-limit output line which is set according to the exhaust gas recirculation rate and the ignition timing, wherein one type of the second output limit is determined as an intersection point of the knock-limit output line and an air-quantity-limit output line which is set according to the exhaust gas recirculation rate, the ignition timing and the atmospheric pressure, wherein another type of the second output limit is determined as an intersection point of the knock-limit output line and a thermal-management-limit output line which is set according to the exhaust gas recirculation rate, the ignition timing and the vehicle running speed, and wherein the exhaust gas recirculation device is controlled according to the target exhaust gas recirculation rate at which the first output limit becomes equal to a lower value among said one and another types of the second output limit.

10. A control apparatus for an internal combustion engine mounted on a vehicle and comprising an exhaust gas recirculation device, the control apparatus comprising:

a controller configured to control operation of the exhaust gas recirculation device and output of the internal combustion engine; and one sensor or a plurality of sensors provided to detect information about an output limiting factor including an atmospheric pressure or vehicle running speed, the internal combustion engine having: a first output limit which is associated with at least a knock limit and whose value increases with increase of an exhaust gas recirculation rate; and a second output limit whose value decreases with decrease of the output limiting factor and with increase of the exhaust gas recirculation rate, wherein the controller is configured to set a target exhaust gas recirculation rate at which the first output limit becomes equal to the second output limit and control the exhaust gas recirculation rate according to the target exhaust gas recirculation rate.

\* \* \* \* \*